Aug. 7, 1928.                                              1,680,050
A. KEPPENS
FOLDING TREE HOLDER
Filed Nov. 9, 1926
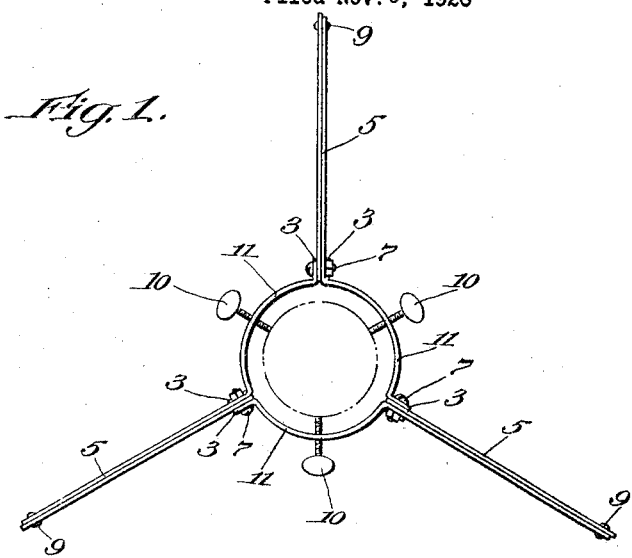
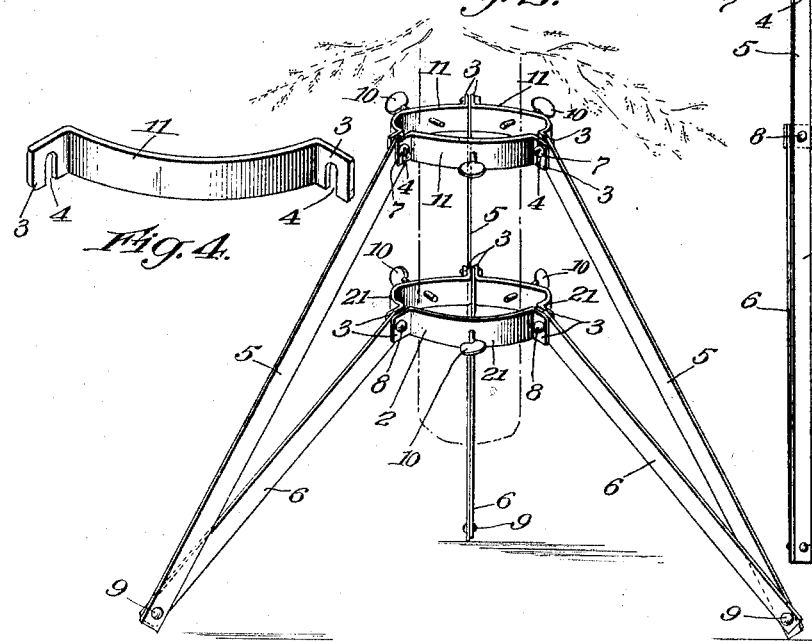
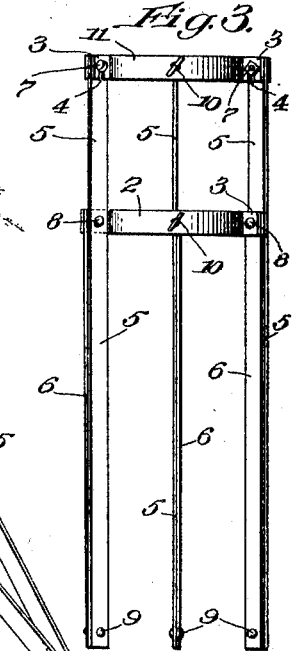
Inventor:
Albert Keppens.
By Joshua R H Torre
his Attorney.

Patented Aug. 7, 1928.

1,680,050

UNITED STATES PATENT OFFICE.

ALBERT KEPPENS, OF BERWYN, ILLINOIS.

FOLDING TREE HOLDER.

Application filed November 9, 1926. Serial No. 147,213.

My invention relates to a folding tree holder and particularly to a folding holder for Christmas trees. The objects of my invention are:

To construct a holder which will furnish a firm base for a Christmas tree or any pole-like object which is required to stand on end; to construct a holder which can be quickly and easily attached to trees of varying diameter and which will fold into a convenient size and shape when not in use; and to construct a stand which can be economically produced, because it can be entirely formed from strips of sheet metal.

Other objects will appear hereinafter.

The invention consists in the combinations and arrangements of parts hereinafter described and claimed.

The invention will be best understood by reference to the accompanying drawings forming a part of this specification, and in which, Fig. 1 is a top view of the holder when open, Fig. 2 is a perspective view of the same, Fig. 3 is a side view of the same, Fig. 4 is a detail view of one section of the upper collar.

The holder is composed of two collars 1 and 2 adapted to be fastened to the lower end of the trunk of a tree, and a plurality of legs, preferably three. All of the parts are preferably formed from strips of sheet metal. The upper collar 1 and the lower collar 2 are each composed of a plurality of arcuate sections 1' and 2' equal in number to the number of legs. The ends of each section 1' and 2' are bent back to form ears 3 each of which is drilled to accommodate a bolt or rivet. Each section 1' and 2' is equipped with a thumb screw 10 passing through a threaded hole in the center of the section, for the purpose of securing the collars 1 and 2 firmly to the tree trunk, and adapted to secure said collars to trunks of various diameters.

Each of the several legs of the holder is composed of two rigid bars, 5 and 6, the bar 5 being longer than the bar 6. The upper end of the bar 5 is pivotally fastened between two ears 3 of adjacent sections 1' by means of a bolt 7 which is composed of a screw and nut; the upper end of the bar 6 is similarly fastened to the lower collar by means of a rivet 8. The outer end of the bar 5 is pivotally connected to the outer end of the bar 6 by means of a rivet 9. It will be seen that this construction holds the collar 1 in line with and above the collar 2, and renders the legs of the stand movable, so that they may be spread out as shown in Figures 1 and 2 or folded as shown in Figure 3. As the legs are spread, collars 1 and 2 move away from each other: and as the legs are folded the collars 1 and 2 approach each other. When the collars are secured at a fixed distance from one another, the legs cannot be moved.

The slots 4 are substituted for the screw holes in one section 1' of the collar 1, as shown in Figure 4, in order that the section may be removed easily to facilitate fastening the stand to the tree.

In use, the legs are spread sufficiently to form a firm base or standard for the tree, the collars 1 and 2 are firmly fastened to the trunk of the tree by means of the thumb screws 10 and the tree is then set up. The fastening of the collars 1 and 2 prevents the legs from spreading further, and the legs hold the tree in an upright position. When the stand is not in use, the legs are pushed in until the bars 5 and 6 coincide, and further inward movement is prevented, the edges of the bars 5 coming to rest against the collar 2.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A tree holder of the class described comprising in combination two collars in vertical alinement, each composed of a plurality of arcuate sections, adapted to be fastened to the trunk of the tree having ears formed at each end thereof, the ears of one of said sections having slots formed therein to render it readily removable; and a plurality of legs, equal in number to the number of sections composing the collar, each leg composed of two bars pivotally connected to the two collars and to each other, adapted to be spread out to form a firm base for the tree, and to fold up when not in use, substantially as described.

2. A tree holder of the class described comprising in combination two collars in vertical alinement, adapted to be fastened to the trunk of the tree; each collar composed of a plurality of arcuate sections having ears formed at each end, said ears having holes drilled therein and the ears of one of said arcuate sections slotted instead of drilled whereby to render said section detachable; a plurality of legs, equal in number to the number of sections composing the collar, and each composed of a longer and shorter bar, one end of each longer bar pivotally connected between the ears of two adjacent sections of one collar by means of bolts and nuts, one end of each shorter bar similarly connected to the other collar by means of rivets, the other ends of the bars pivotally connected together in pairs, one longer and shorter bar together by means of rivets; the said legs adapted to be spread out to form a base for the tree and to fold up when not in use, substantially as described.

In testimony whereof I have signed my name to this specification.

ALBERT KEPPENS.